INVENTOR.
ROBERT E. JONES

Shanley & O'Neil
ATTORNEYS.

Feb. 8, 1966  R. E. JONES  3,233,558
VEHICLE FOR USE IN TANDEM

Filed Aug. 16, 1963

INVENTOR.
ROBERT E. JONES
BY Shanley & O'Neil
ATTORNEYS.

United States Patent Office 3,233,558
Patented Feb. 8, 1966

3,233,558
VEHICLE FOR USE IN TANDEM
Robert E. Jones, c/o Sandford-Day Corporation,
P.O. Box 1511, Knoxville, Tenn.
Filed Aug. 16, 1963, Ser. No. 302,536
6 Claims. (Cl. 105—1)

The present invention relates to tandem vehicles more particularly to trains of vehicles of the open top load carrying type adapted to be loaded one after the other from a superposed source of material. Such vehicles are often used in mining for carrying mineral materials such as coal or ore or the like and are usually railway rolling stock that rides on tracks and that has drop bottom doors that open to dump the vehicles. The invention will be described and illustrated by way of example in connection with drop bottom mine cars, but it is to be expressly understood that the present invention is adaptable to a variety of other environments and that the invention is not to be limited by the illustrative examples but only by the claims.

The present application is a continuation-in-part of copending application Serial No. 118,835, filed June 22, 1961.

In the art of loading tandem vehicles in an articulated train from a source of material that loads into the open tops of the vehicles, it is advantageous to load the vehicles continuously as though they presented one continuous load-receiving body instead of a plurality of spaced load-receiving bodies. To do this, however, it is necessary to load continuously between the cars. Obviously, a problem arises from spillage of material between the cars. Substantial spillage cannot be tolerated, because it is ordinarily the loading station that remains fixed and the cars that move, with the result that spillage between the cars becomes concentrated adjacent the loading station and is not only wasteful of material but also soon interferes with passage of the cars through the loading station.

A number of attempts have been made to close the gap between the cars so as to avoid or to minimize spillage. However, in general, these prior art provisions have suffered from one or the other of two disadvantages: either they were ineffective to close the gap between the cars, or else if they closed the gap they impeded the articulation of the cars when the cars were passing along track of relatively small radius of curvature.

One way of trying to close the gap between the cars might be to provide the cars with overlapping adjacent end walls. Cars such as mine cars ordinarily have inclined end walls, because this arrangement increases the load carrying capacity of the car. The end walls, however, cannot be inclined at angles less than the angle of repose of the material on the wall, lest the material simply remain on the end wall and fail to dump. Therefore, in order to make the end walls overlap a sufficient distance to close the gap, and at the same time to preserve a desirably steep angle of end wall inclination, it would be necessary to increase the height of the end walls. However, increasing the height of the end walls would increase the height of the cars; and a major problem in the art of mine cars has been the maintenance of maximum load carrying capacity with low mine car height, so that the cars can be used in mines of low headroom. Accordingly, merely raising the height of the end walls is no satisfactory solution to the problem of preventing spillage between cars because the price in terms of increased headroom is too great to pay.

It is also no suitable solution to move the cars closer together, for this prevents the train from traversing relatively sharp curves. Moreover, the automatic couplers now commonly used between cars require a greater spacing between cars than did the manually-operated couplers of the past, and this of course results in a wider gap to bridge between cars.

Another solution has been to provide plates or bridge caps that bridge the gap between the end walls and that are movable relative to both of the cars, as in U.S. Patent No. 2,839,010. However, such an arrangement not only impedes the articulation of the train of vehicles but also requires that the bridge plate rise and increase the height of the train when the train is on a curve.

Still another proposal for preventing spillage between cars and at the same time maintaining a desirably steep angle of inclination of the end walls without unduly increasing the height of the end walls, has been to make one end wall overlap the end wall of the adjacent car and then to move the cars through the loading station in a direction such that the overlying end wall precedes the underlying end wall through the loading station. However, this method suffers from the disadvantage that loading can be effected only in one direction without spillage between cars, while in practice it is desirable to be able to load in either direction of train movement through the loading station.

Although these and many other attempts and proposals have been made to overcome the above and other difficulties and disadvantages in the art of loading tandem vehicles, none, as far as is known, has been entirely successful when practiced commercially on an industrial scale.

Accordingly, it is an object of the present invention to provide tandem load carrying vehicle assemblies adapted to reduce spillage between vehicles.

Another object of the present invention is the provision of tandem load carrying vehicle assemblies that can be loaded in either direction of vehicle movement.

Still another object of the present invention is the provision of vehicle assemblies that achieve the above objects without providing shelves for the accumulation of loaded material and that do not increase the height of the vehicles or reduce the load carrying capacity of the vehicles, and that do not interfere with the articulation of the vehicle train.

Finally, it is an object of the present invention to provide tandem assemblies of load carrying vehicles which will be relatively simple and inexpensive to manufacture, maintain and repair, dependable to operate, and rugged and durable in use.

Other objects and advantages of the present invention will become apparent from a consideration of the following description, taken in connection with the accompanying drawings, in which.

Figure 1:
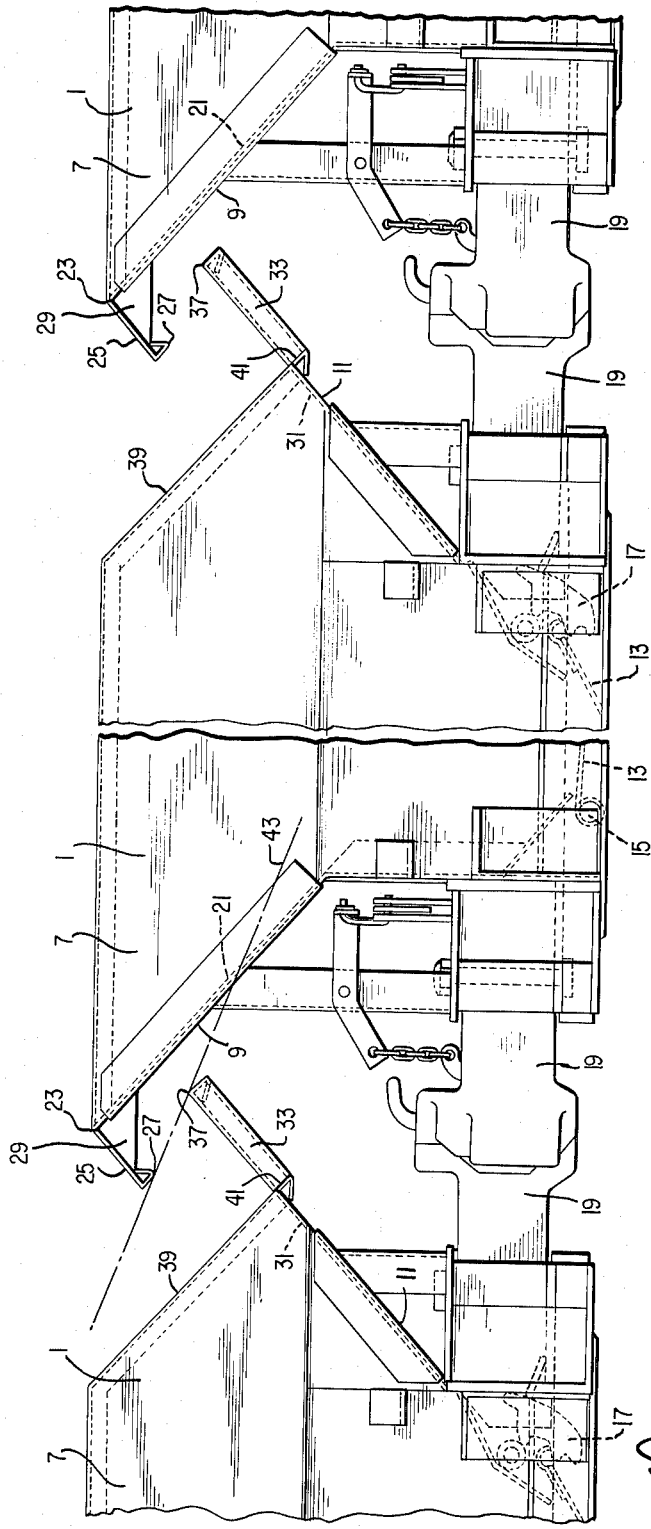
FIGURE 1 is a side elevational view, with parts broken away, of a portion of a train of vehicles according to the present invention.

Referring now to the drawings in greater detail, and first with reference to FIGURE 1, there is shown a pair of drop bottom mine cars 1 provided with the usual flanged wheels 3 by which they ride on tracks 5. Each car 1 has a pair of opposite side walls 7 and an end wall 9 at one end thereof and end wall 11 at the other end thereof. One or more drop bottom doors 13 are provided for each car 1, each door 13 being mounted for vertical swinging movement adjacent one end thereof about a horizontal axle 15 carried by the car. Latch means 17 adjacent one end of the car releasably hold the adjacent door closed, while the additional doors are releasably held closed by means of that adjacent door and each other. Automatic couplers 19 releasably interconnect adjacent cars 1 in an articulated train. All the structure in the detail mentioned thus far is old in this art. Reference is had to the above-identified pending application for a more complete description of the nature and function of such structure so as to avoid the inclusion of unnecessary disclosure in the present application.

End walls 9 and 11 overlap each other at least in part. End wall 9 is the upper or overlying end wall, while end wall 11 of the adjacent car is the lower or underlying end wall. Each end wall 9 has an inclined portion 21 that is upwardly inclined in a direction toward the adjacent car. Upwardly inclined portion 21 terminates on its upper edge in a straight bend 23, which is adjoined on the side of bend 23 opposite upwardly inclined portion 21 by a downwardly inclined portion 25, which inclines downwardly toward the adjacent car. Preferably, end wall 9 is sheet material such as sheet steel, and this material is simply bent at 23 to provide an upwardly convex bend along a straight horizontal bend line coplanar with the upper edges of side walls 7 and extending transversely of the direction of movement of car 1. It will also be understood, however, that downwardly inclined portion 25 may be separately attached to its associated upwardly inclined portion 21.

Both upwardly inclined portion 21 and downwardly inclined portion 25 have upper surfaces that are disposed at a greater angle to the horizontal than the angle of repose of the material to be loaded in cars 1.

It should be noted that the uppermost surface of downwardly inclined portion 25 is preferably flat and in any event is of a radius of curvature in cross section substantially larger than the cross-sectional radius of curvature of bend 23. Thus, downwardly inclined portion 25 is substantially flatter than bend 23.

Downwardly inclined portion 25 terminates in a lowermost edge 27 which is straight and horizontal in the illustrated embodiment. Reinforcing webs 29 are spaced apart laterally of the end of the car and rigidly join inclined portions 21 and 25 in the region of bend 23. Preferably, they are triangular and are disposed immediately below bend 23.

Turning next to the underlying end of the adjacent car 1, it will be seen in FIGURE 1 that end wall 11 has an upwardly inclined portion 31 that is inclined upwardly toward the overlying end wall 9 of the other or adjacent car 1. Inclined portion 31 is characterized by an extension 33 that extends upwardly in the plane of portion 31 a distance farther toward the other car 1. Extension 33 is generally V-shaped as seen in plan, as in FIGURE 12, and is characterized by a pair of uppermost converging edges 35 that together define an obtuse angle. Edges 35 meet in an uppermost portion 37 of the end wall 11.

Edges 35 of extension 33 are free edges and are not bounded by side walls 7 of the car 1. Instead, side walls 7 adjacent the lower or underlying end of the car are characterized by upper edges 39 that decline downwardly from the highest portions of side walls 7 to the outer end 41 of the obtusely angularly related edges 35 of extension 33. As seen from the side, as in FIGURE 1, therefore, and proceeding from left to right, upper edges 39 dip downwardly, and then the upper surface of the extension 33 rises again, so as to provide in effect a gap or depressed free space between the uppermost portion 37 of end wall 11 and the highest portions of side walls 7.

Another important relationship of the overlapping adjacent car ends is that the plane which includes the lowermost portion of downwardly inclined portion 25 of the high or overlying end of the car and which also includes the uppermost portion of the low end of the car, is inclined to the horizontal at a lesser angle than the angle of inclination of inclined portions 21, 25 and 31. Inclined portions 21, 25 and 31 need not all be inclined at the same amount, but the angle of inclination of the plane just described should be less than the angle of inclination of any of them.

In FIGURE 1, the plane just described is shown as a plane 43 determined by edge 27 and uppermost portion 37. It will be seen that plane 43 is in fact less sharply inclined than any of portions 21, 25 and 31. If for example portions 21, 25 and 31 were inclined at, say, an angle of 43°30', then plane 43 might be inclined at an angle no greater than, say, 40°. The inclination of plane 43 can thus be significantly related to the inclination of portions 21, 25 and 31 because these latter three portions will ordinarily be inclined at an angle at least as great as, but preferably not substantially greater than, the angle of repose of the material on itself and on the upper surfaces of portions 21, 25 and 31. In other words, because of this relationship, the angle of inclination of plane 43 with the horizontal would be at least equal to or greater than the angle of repose of load material with the horizontal. As was explained above, it is desirable to have at least portions 21 and 31 inclined at the smallest possible angle to the horizontal so as to reduce the overall height of the cars while at the same time providing for the maximum load carrying capacity, it being understood that the length of couplers 19 cannot in practice be greatly reduced, especially in the case of automatic couplers such as are most commonly in use nowadays.

FIGURES 2 through 11 are schematic views showing the loading of mine cars when traveling in either direction relative to the loading station, and comparing the loading of earlier mine cars with the loading of mine cars according to the present invention. FIGURES 2 through 6 compare the loading of earlier types of trains in one direction with the loading of those earlier trains in the opposite direction; while FIGURES 7-11 show the loading and unloading of mine car trains according to the present invention.

Figure 2:
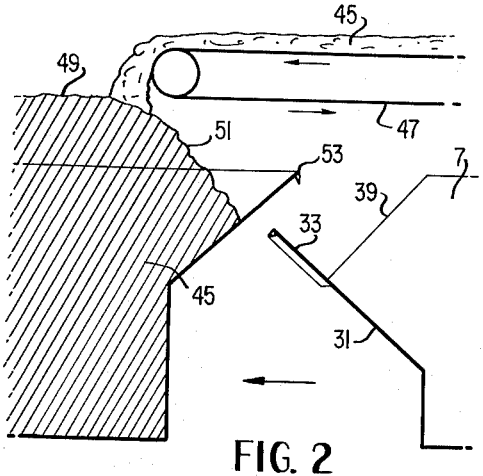
FIGURES 2-6 are schematic views showing how earlier forms of cars may be loaded in one direction but not in the other.

Referring first to FIGURE 2, a pair of earlier mine cars 1 are there shown being loaded with material from an endless conveyor belt 47. The cars are shown traveling in the direction which was favorable to their loading according to the prior art with the low end of the car leading and the high end of the car trailing, so that the inclined end wall 9 of the forward car overlapped the front end wall 11 of the car immediately to the rear. The arrows in FIGURE 2 show that the cars are moving in tandem from right to left as seen in that figure. As is also seen in FIGURE 2, material 45 is being loaded to a uniform level somewhat higher than the top of the side walls of the cars. The loaded height is indicated by the generally horizontal profile 49, while the incline down which material 45 tumbles during the loading operations, and which continuously advances to the rear of the forward car 1, is indicated by the inclined profile 51. The angle that inclined profile 51 makes with the horizontal is less than the angle that the inclined end walls of the cars make with the horizontal.

Figure 3:
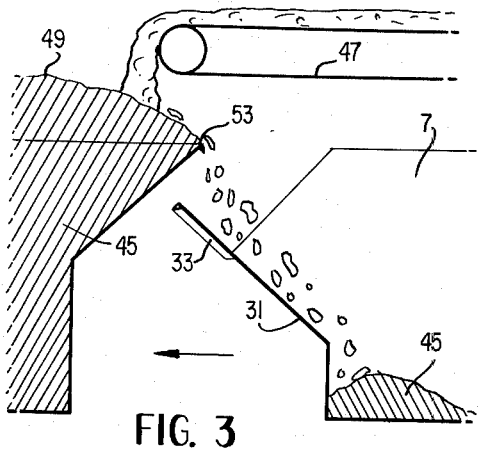

After the lower end of profile 51 reaches the rear end of the forward car 1, indicated at 53 in FIGURES 2 and 3, the movement of profile 51 relative to its associated car 1 ceases. Thereafter, further material 45 does not add to the material in the forward car 1, but instead tumbles down profile 51 and lands in the front of the car to the rear, as is seen in FIGURE 3. This material tumbles down the inclined front end wall of the rear car and comes to rest at the bottom of the rear car 1 with its profile at the angle of repose of the piled material.

Figure 4:
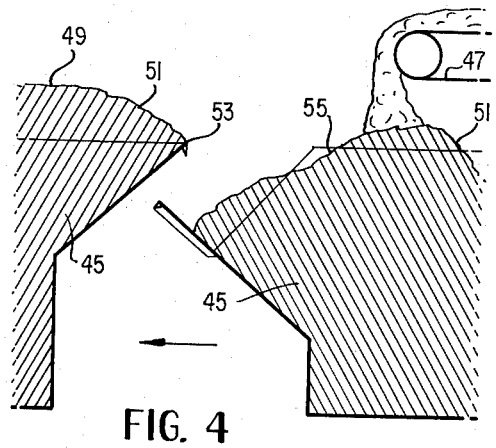

It will of course be understood that almost half the rear car could be filled while maintaining the relationship of the equipment shown in FIGURE 3. This is because the material building up in the bottom of the rear car 1 will settle to its angle of repose, so that a good bit of the bottom of car 1 can be covered and material piled into the car to a considerable depth adjacent the front end of the rear car. However, if the train of cars is moving at a constant velocity past the loading station, then the material will not build to a great height in the front end of the car. As the point of filling the rear car moves toward the rear of the rear car, however, as is seen in FIGURE 4, it takes less and less time to build a high pile of material in the car, because the material previously deposited in the car has reduced the depth to which material must be loaded into the car in order to fill the car to the height of profile 49. Therefore, as is seen in FIGURE 4, an arcuate profile 55 builds up in the front of the rear car, the most steeply inclined portion of arcuate profile 55, adjacent the lower left end thereof as seen in FIGURE 4, being inclined at an angle no greater than the angle of repose of material 45, and the angle of the tangents to the profile 55 decreasing to zero as profile 55 merges into the horizontal profile 49 that extends toward the rear of the car and then turns relatively sharply downwardly along profile 51 at the rear of the car as the car becomes filled.

In other words, under conditions of uniform velocity of the car through the loading station, the rear of the car tends to be more highly piled with material than the front of the car, and in no ordinary case in which the cars move through the loading station with constant velocity will the front end of the car be so overloaded with material that any material will spill from the front of the car. In the direction of car loading of FIGURE 2 through 4, therefore, the loaded condition of the rear of the car is the condition that regulates the loading of the car, and not the loading of the front of the car. This explains why earlier cars could be loaded in the direction shown in FIGURES 2-4 without giving rise to a problem of spillage between the cars.

Figure 5:
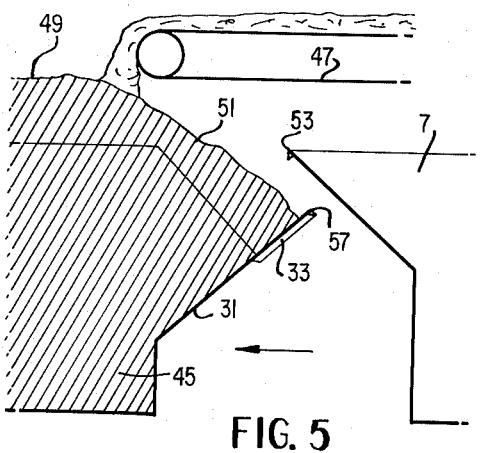
Figure 6:
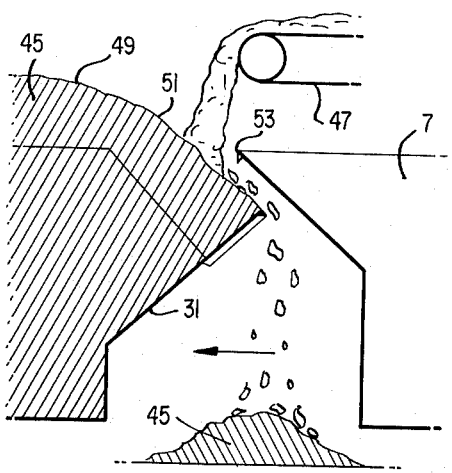

FIGURES 5 and 6 show the same earlier cars as in FIGURES 2-4, but show them being loaded in the opposite direction, that is, the high end of each car is the forward end of the car and the low end of each car is the rear end of the car. As is seen in FIGURE 5, the horizontal profile 49 of the loaded material is at the same height above the side walls of the car as in FIGURES 2-4 and the profile 51 inclined at the angle of repose of the material moves toward the rear of the car as loading proceeds. But now the gap between the car ends is turned the other way, so that profile 51 advances toward end 57 of the forward car. When profile 51 reaches end 57, profile 51 stops but material 45 does not. FIGURE 6 shows what happens. The position of profile 51 now does not change, but the point of delivery of material 45 to profile 51 moves downwardly to the rear along profile 51, this material sliding off profile 51 and falling between the cars. The rear car does nothing to impede this spillage until front end 53 of the rear car moves beneath the delivery end of the conveyor that is delivering material 45, after which the rear car begins to be loaded.

Figure 7:
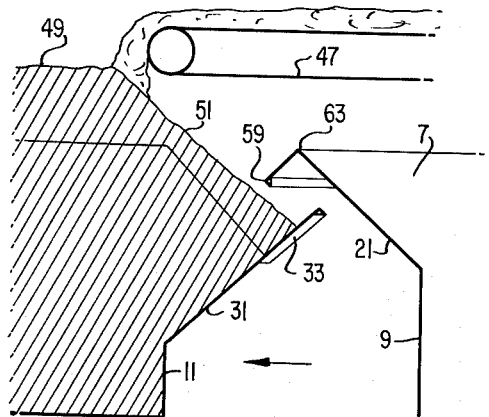
FIGURES 7-11 are schematic views showing the loading and unloading of tandem cars according to the present invention.

FIGURES 7 through 11 show cars according to the present invention, moving in the same direction as in FIGURES 5 and 6, which is in the same direction that caused the trouble with the earlier trains as shown in FIGURE 6. In this direction, the cars move from right to left as seen in FIGURES 7-11, with the high end of each car leading and the low end of each car trailing. FIGURE 7 corresponds to FIGURE 5 and shows profile 51 advancing to the right relative to the forward car.

Figure 8:
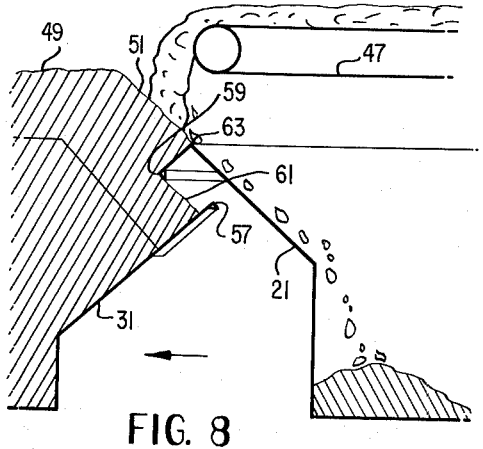

However, FIGURE 8 shows what happens when the parts are in about the same relative position as in FIGURE 6. Before profile 51 could advance to end 57, it encountered the lower end 59 of the downwardly inclined portion that characterizes the present invention. The lower portion of profile 51, shown in FIGURE 8 at 61, therefore stopped at a position determined by lower end 59. Profile 61 does not extend to end 57. Meanwhile, however, the remainder of profile 51 has moved to the right relative to its associated car as seen in FIGURE 8, until it reaches highest point 63 on the overlying car end. At this point profile 51 stops and further material 45 moves down the inclined end wall of the rear car and begins to fill the rear car with material.

Figure 9:
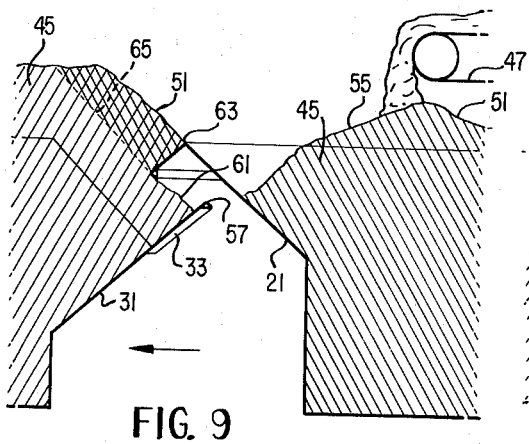

As the rear car continues to fill up with material, as seen in FIGURE 9, the material takes on an arcuate profile 55 as also in the case of FIGURE 4 and for the same reasons as are set forth in connection with FIGURE 4. It will be noted, however, that the profile 51 in the forward car is located not by highest point 57 at the rear end of the forward car, but rather by highest point 63 at the forward end of the rear car. Point 63 being substantially higher than point 57, it follows that the front car will carry more load than can the earlier car shown in FIGURE 6. In FIGURE 9, this difference in load-carrying capacity is illustrated by a heavy broken line 65 at the upper left portion of FIGURE 9. The area to the upper right of line 65, shown in double cross-hatching in FIGURE 9, represents material that can be carried by cars according to the present invention which could not be carried by earlier cars.

It will also be remembered that the forward end of the car is not loaded to full capacity but that the rear end of the car is loaded to full capacity; and, as was pointed out above, it is the load-carrying capacity of the rear end of the car that determines the loading characteristics of the whole train. When the cars are arranged as in FIGURE 9, with the low end of the car trailing and the high end of the car leading, maximum load-carrying capacity is obtained, because the low end of the car has greater load-carrying capacity than the front end of the car inasmuch as its inclined wall is lower.

It follows, therefore, that if the cars are run through the loading station at constant speed in the direction of FIGURES 5 and 6, more material can be loaded into the cars than if they are run through the station in the direction of FIGURES 2 through 4. However, FIGURE 6 shows that cars according to the prior art could not be run through the station in this advantageous direction without spillage. FIGURES 7-9, however, show that cars according to the present invention can be run through the loading station in the preferred direction and be loaded more heavily without spillage between the cars. In addition, the very downwardly directed member that prevents the spillage between the cars in FIGURES 7-9 also further positively increases the load-carrying capacity of the car as indicated by the double-cross-hatched area to the upper right of line 65. This downwardly directed member shifts the locator of profile 51 from point 57 upon the forward car to point 63 on the rear car. It is the rear car, therefore, that determines the load limit of the forward car according to the present invention, and not the forward car itself as in the earlier construction. Moreover, the downwardly directed member of the rear car now serves in effect as a portion of the rear wall of the forward car and thus functions not only to prevent spillage between the cars but also to serve as an upward extension of the rear wall of the forward car so as to increase the load-carrying capacity of the rear of the forward car without increasing the height of the vehicle train in any way.

Figure 10:
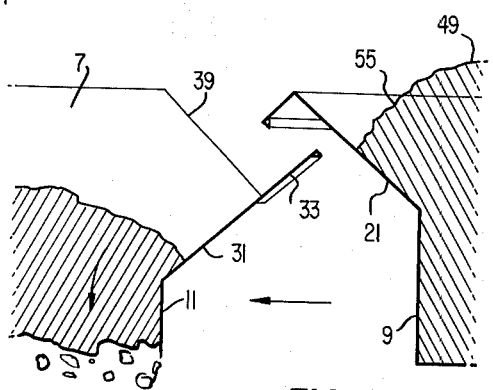

FIGURE 10 shows tandem vehicles in a dumping station. The forward vehicle is dumping, and its drop bottom is open. The material is rapidly discharging. It is especially to be noted that not only the material that was on the inclined rear end wall of the forward car has slid down and is passing through the open bottom of the car, but also the material that was supported by the downwardly inclined portion of the rear car has slid down because this downwardly inclined portion at the very front of the rear car is inclined at an angle greater than the angle of repose of the material.

Figure 11:
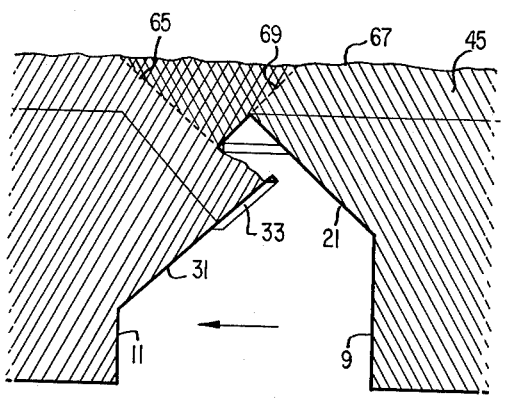

FIGURE 11 indicates a method of loading in connection with cars according to the present invention so as to achieve a maximum load-carrying capacity. In the method suggested by FIGURE 11, the cars are moved through the loading station at non-uniform velocity. In general, the cars dwell longer in the loading station when the front ends of the cars are being loaded than when the rear ends of the cars being loaded, for reasons discussed above. The result is that the cars can be loaded to a uniform horizontal profile 67 that is continuous between the various cars. Such loading would obviously be impossible with earlier cars as in FIGURES 5 and 6, for such earlier cars could not be loaded between the cars without spillage between the cars. Indeed, in addition to the profile 65 shown in broken line in FIGURES 9 and 11 as the limiting profile for loading of the rear of a mine car according to the earlier constructions, there would be an inclined profile 69 at the front of each car forwardly of which the car could not be loaded without spilling between the cars. Therefore, the double-crosshatched area between the lines 65 and 69 in FIGURE 11 represents an increase in loading capacity available by use of the present invention when the cars are moved at selectively non-uniform velocities through the loading station. Moreover, it will be appreciated that the cars can be loaded to the uniform top profile 67 shown in FIGURE 11 much more rapidly than if the cars had to be carefully loaded until the profiles 65 and 69 were achieved so as to avoid spilling between prior art cars as in FIGURES 5 and 6. In other words, to achieve the profiles 65 and 69 with the earlier cars, a great deal more care in loading would have to be taken than to achieve the profile 67 by loading cars according to the present invention at non-uniform velocities.

Figure 12:
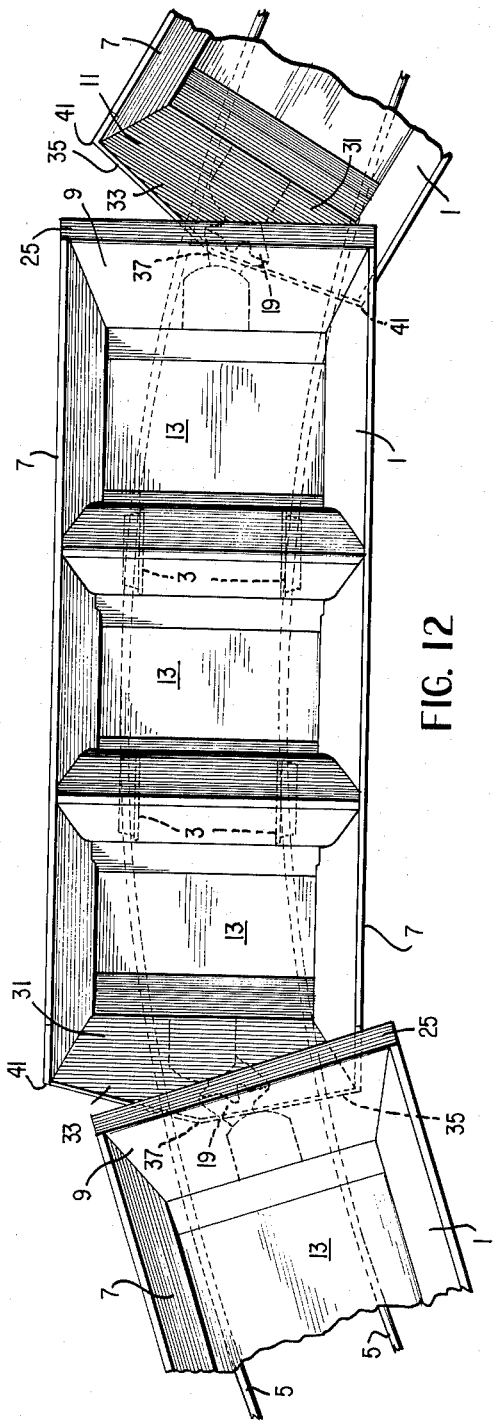
FIGURE 12 is a plan view of a train of vehicles according to the present invention traversing a curve.
Figure 13:
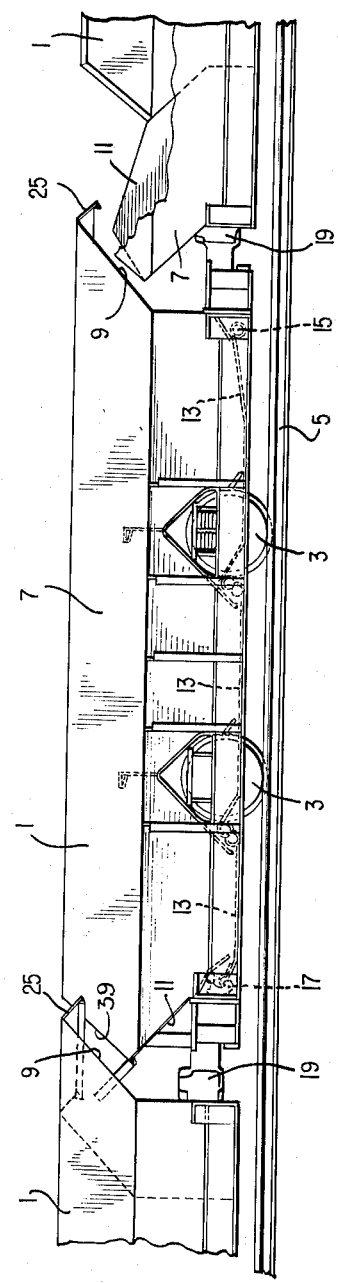
FIGURE 13 is a side elevational view of the vehicles of FIGURE 12.

FIGURES 12 and 13 show in plan and side elevation, respectively, a train of cars according to the present invention traversing a curve. As can be seen from the two connections shown toward the right and left hand ends of FIGURES 12 and 13, the adjacent car ends assume a variety of positions relative to each other depending upon their positions relative to the curve and the straight portions of the track. As will be apparent from a consideration particularly of the left hand ends of FIGURES 12 and 13, the fact that upper edges 39 of side walls 7 decline downwardly toward ends 41 of edges 35 of extension 33 is quite important in accommodating lowermost edge 27 of downwardly inclined portion 25. The right hand ends of FIGURES 12 and 13 should also be noted as showing the significance of the V-shaped configuration of extension 33. The fact that edges 35 diverge rearwardly from an uppermost central portion 37 is quite important as avoiding interference between edges 35 and the adjacent end wall 9 of the adjacent car 1. Of course, if the cars are loaded along their midline, then the natural piling effect of the loaded material will assure that none will spill over the side edges 35, because the piles will extend the farthest to the left as seen in FIGURES 12 and 13 only along the midline of the vehicle.

From a consideration of the foregoing disclosure, therefore, it will be obvious that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. A pair of wheeled vehicles, each having end walls and an open top, one of the vehicles having an end wall adjacent the other vehicle which end wall is inclined upwardly in the direction of the other vehicle and has longitudinally extended planar means mounted adjacent its upper end, the longitudinally extended planar means being inclined downwardly toward the other vehicle and overlapping an end wall of the other vehicle for directing load material toward the other vehicle, the longitudinally extended planar means having a lower portion and the overlapped end wall of the other vehicle having an upper portion which lie in a plane which is less steeply inclined than the upwardly inclined end wall.

2. A pair of wheeled vehicles, each having end walls and an open top, one of the vehicles having an end wall adjacent the other vehicle which end wall is inclined upwardly in the direction of the other vehicle and adjacent its upper end has a longitudinally extended planar means inclined downwardly toward the other vehicle and overlapping an end wall of the other vehicle for preventing a loss of load material between the vehicles, the end wall of the other vehicle terminating in an upper edge having a central portion which is closer to the end wall of the one vehicle than end portions of the upper edge when the wheeled vehicles are in longitudinal alignment with each other.

3. A pair of wheeled vehicles, each having end walls and an open top, one of the vehicles having an end wall adjacent the other vehicle which end wall is inclined upwardly in the direction of the other vehicle and has longitudinally extended planar means mounted adjacent its upper end, the longitudinally extended planar means being inclined downwardly toward the other vehicle and overlapping an end wall of the other vehicle for directing load material toward the other vehicle, the longitudinally extended planar means having a lower portion and the overlapped end wall of the other vehicle having an upper portion which lie in a plane having an angle of inclination with the horizontal which is no greater than the angle of repose of load material with the horizontal.

4. A pair of wheeled vehicles, each having end walls and an open top, one of the vehicles having an end wall adjacent the other vehicle which end wall is inclined upwardly in the direction of the other vehicle and adjacent its upper end has a longitudinally extended planar means inclined downwardly toward the other vehicle and overlapping an end wall of the other vehicle over substantially the full transverse width of said end wall when the wheeled vehicles are in longitudinal alignment with each other for preventing a loss of load material between the vehicles during loading, the end wall of the other vehicle terminating in an upper edge having a central portion which is closer to the end wall of the one vehicle than end portions of the upper edge when the wheeled vehicles are in longitudinal alignment with each other.

5. A vehicle having a first endwall and a second endwall, the vehicle being designed to be arranged in tandem with a second vehicle with the first endwall in overlapping relationship with an endwall of the second vehicle, the first endwall being upwardly inclined and having material directing means joined to its upper end, the material directing means being longitudinally extended in the direction of the second vehicle when arranged in tandem and inclined downwardly toward the second vehicle in overlapping endwall relationship with the endwall of the second vehicle such that a straight line extended between a lowermost portion of the material directing means and an uppermost portion of the endwall of the second vehicle has an angle of inclination with the horizontal which is less steeply inclined with respect to the horizontal than is the material directing means.

6. A vehicle having a first endwall and a second endwall, the vehicle being designed to be arranged in tandem with a second vehicle with the first endwall of the claimed vehicle in overlapping relationship with an endwall of the second vehicle, the first endwall being upwardly inclined and having material directing means joined to its upper end, the material directing means being longitudinally extended in the direction of the second vehicle when arranged in tandem and inclined downwardly toward the second vehicle in overlapping endwall relationship with the endwall of the second vehicle such that a straight line extended between a lowermost portion of the material directing means and an uppermost portion of the second endwall of the second vehicle has an angle of inclination with the horizontal which is less steeply inclined with respect to the horizontal than is the material directing means; the second endwall being upwardly inclined in a direction away from the first endwall with a central portion of greater length longitudinally of the vehicle than portions of the second endwall spaced laterally from the central portion.

References Cited by the Examiner
UNITED STATES PATENTS

| | | | |
|---|---|---|---|
| 1,062,492 | 5/1913 | Monberg | 105—364 |
| 2,142,412 | 1/1939 | Ramsey | 105—364 |
| 2,640,441 | 6/1953 | Jones | 105—364 |
| 2,839,010 | 6/1958 | Harbulak | 105—4 |

ARTHUR L. LA POINT, *Primary Examiner.*
LEO QUACKENBUSH, *Examiner.*